(12) United States Patent
Ko et al.

(10) Patent No.: US 11,078,971 B2
(45) Date of Patent: Aug. 3, 2021

(54) CLUTCH CONTROL REFERENCE VALUE SETTING METHOD

(71) Applicants: Hyundai Motor Company, Seoul (KR); Kia Motors Corporation, Seoul (KR)

(72) Inventors: Young Ho Ko, Yongin-si (KR); Tae Hee Cho, Hwaseong-si (KR); Ho Young Lee, Bucheon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/804,684

(22) Filed: Feb. 28, 2020

(65) Prior Publication Data

US 2021/0131509 A1    May 6, 2021

(30) Foreign Application Priority Data

Nov. 1, 2019    (KR) .................... 10-2019-0138941

(51) Int. Cl.
    *F16D 48/06* (2006.01)
    *F16D 48/02* (2006.01)

(52) U.S. Cl.
    CPC ........ *F16D 48/066* (2013.01); *F16D 48/0206* (2013.01); *F16D 2500/1026* (2013.01); *F16D 2500/3022* (2013.01); *F16D 2500/3024* (2013.01); *F16D 2500/50251* (2013.01); *F16D 2500/7082* (2013.01); *F16D 2500/70605* (2013.01)

(58) Field of Classification Search
    None
    See application file for complete search history.

(56) References Cited

U.S. PATENT DOCUMENTS

| | | | | |
|---|---|---|---|---|
| 8,577,571 | B2* | 11/2013 | Einfinger | F16D 48/066 701/67 |
| 9,279,464 | B2* | 3/2016 | Trutschel | F16D 48/02 |
| 10,801,562 | B2* | 10/2020 | Ko | F16D 25/082 |
| 2018/0172091 | A1 | 6/2018 | Kim et al. | |

FOREIGN PATENT DOCUMENTS

KR    20180069946 A    6/2018

* cited by examiner

*Primary Examiner* — Timothy Hannon
(74) *Attorney, Agent, or Firm* — Slater Matsil, LLP

(57) ABSTRACT

Disclosed is a clutch control reference value setting method including generating a current-hydraulic pressure model, setting a temporary VKP to a current causing a maximum difference between a model hydraulic pressure and a measured hydraulic pressure, determining that the temporary VKP is valid when a deflection amount calculated from a difference integral value acquired by integrating differences between the model hydraulic pressure and the measured hydraulic pressure while increasing the current is greater than a first reference value under a condition that the first target pressure is applied to the clutch, determining that the temporary VKP is appropriate when a deflection amount calculated from a difference integral value acquired by integrating differences between the model hydraulic pressure and the measured hydraulic pressure while increasing the current is proper under a condition that a second target pressure is applied to the clutch.

18 Claims, 7 Drawing Sheets

CLUTCH CONTROL REFERENCE VALUE SETTING METHOD

CROSS-REFERENCE TO RELATED APPLICATION

This application claims priority to Korean Patent Application No. 10-2019-0138941, filed in the Korean Intellectual Property Office on Nov. 1, 2019, which application is hereby incorporated herein by reference.

TECHNICAL FIELD

Embodiments of the present invention relate to a technology which sets a control reference value to control a hydraulic multiple disc clutch used in a transmission for vehicles and the like.

BACKGROUND

As exemplarily shown in FIG. 1, a hydraulic multiple disc clutch is configured such that multiple clutch plates 500 and multiple clutch discs 502 alternately overlap between two rotors A and B, a piston 504 moved by hydraulic pressure applies pressure to the overlapping clutch plates 500 and clutch discs 502 so as to form an engaged state in which the clutch plates 500 and the clutch discs 502 are adhered closely to one another to transmit power and, when the hydraulic pressure applied to the piston 504 is released, the piston 504 is restored to the original position thereof by elastic force of a spring 506 so as to form a released state in which the clutch plates 500 and the clutch discs 502 are rotatable relative to each other.

Hereinafter, for reference, the hydraulic multiple disc clutch will be referred to simply as a "clutch".

FIG. 1 illustrates two clutches which are configured such that a hydraulic pressure is controlled and supplied to each clutch, a desired hydraulic pressure is supplied to the piston 504 of the clutch by controlling a line pressure supplied by a solenoid valve 510 controlled by a controller 508, and the hydraulic pressure supplied to the piston 504 is measurable by each hydraulic pressure sensor 512.

A hydraulic pressure supplied to the clutch under the control of the solenoid valve 510 tends to be linearly proportional to a control current via which the controller 508 gives the command to the solenoid valve 510, except for some sections.

The reason why the control current and the hydraulic pressure are not linearly proportional to each other in some sections is mainly due to the structure of the clutch.

That is, when the control current of the solenoid valve 510 is gradually increased, at the initial stage, at which the spring 506 of the clutch is not compressed, the hydraulic pressure applied to the piston 604 of the clutch is linearly increased as the control current is increased, but, until the spring 506 starts to be compressed by the piston 504, which is moved by the increase in the control current, and thereby initial movement of the piston 405 is stopped by adhesion between the clutch discs 502 and the clutch plates 500, the hydraulic pressure forms a non-linear section due to a change in the volume of a space to which the hydraulic pressure of the clutch is applied, and after the initial movement of the piston 405 is stopped, linearity of the hydraulic pressure is restored.

Power transmission between the two rotors which are connected in the clutch is performed from a position where linearity of the hydraulic pressure is restored due to completion of the volume change of the space, to which the hydraulic pressure of the clutch is applied, caused by stoppage of the initial movement of the piston 504 due to adhesion between the clutch discs 502 and the clutch plates 500, this position is defined as a volumetric kiss point (VKP) or a volumetric touch point (VTP), and when the clutch is controlled, the solenoid valve 510 is controlled basically in consideration of the VKP as a control reference value.

Therefore, when a transmission is manufactured, the controller 508 may be configured to rapidly and accurately set the VKP through learning, and thus, thereafter, under the condition that the transmission is installed in a vehicle, the controller may control the clutch based on the above set accurate VKP.

The above description has been provided to aid in understanding of the background of the present invention and should not be interpreted as conventional technology known to those skilled in the art.

SUMMARY

Therefore, embodiments of the present invention have been made in view of the above problems, and an embodiment of the present invention provides a clutch control reference value setting method in which a VKP of a hydraulic multiple disc clutch controlled by a solenoid valve may be more rapidly and correctly learned.

Embodiments of the present invention include the provision of a clutch control reference value setting method including generating a current-hydraulic pressure model using a slope of a hydraulic pressure applied to a clutch, measured while a controller applies a current to a solenoid valve, setting a temporary VKP to a current causing a maximum difference between a model hydraulic pressure due to the current-hydraulic pressure model and a measured hydraulic pressure, determining validity by setting a pressure lower than a temporary VKP pressure, which is a model hydraulic pressure at the temporary VKP, by a designated deduction rate, to a first target pressure and determining that the temporary VKP is valid when a deflection amount calculated from a difference integral value acquired by integrating differences between the model hydraulic pressure and the measured hydraulic pressure while increasing the current is greater than a designated first reference value under a condition that the first target pressure is applied to the clutch, determining appropriateness by setting the temporary VKP pressure determined to be valid to a second target pressure and determining that the temporary VKP is appropriate when a deflection amount calculated from a difference integral value acquired by integrating differences between the model hydraulic pressure and the measured hydraulic pressure while increasing the current is greater than a designated second reference value and is less than a designated third reference value under a condition that the second pressure is applied to the clutch, and updating a VKP with the temporary VKP determined to be appropriate.

In the generating the current-hydraulic pressure model, the current-hydraulic pressure model may be generated by acquiring a slope of the measured hydraulic pressure according to a current increase by applying a first ramp current, which is gradually increased until the measured hydraulic pressure measured by a hydraulic pressure sensor reaches a designated first reference hydraulic pressure, to the solenoid valve.

In the setting the temporary VKP, the temporary VKP may be set to the current causing the maximum difference between the model hydraulic pressure and the measured hydraulic pressure by calculating differences between the model hydraulic pressure and the measured hydraulic pressure by applying a second ramp current which is gradually increased until the measured hydraulic pressure measured by a hydraulic pressure sensor reaches a designated second reference hydraulic pressure.

In the determining the validity, when the deflection amount is the first reference value or less, the validity of the temporary VKP may be ensured by updating the temporary VKP pressure with a new temporary VKP pressure, acquired by decreasing the temporary VKP pressure by the deduction rate, setting the first target pressure using the updated temporary VKP pressure and repeatedly performing the determination of the validity.

The determining the validity may include calculating the difference integral value by integrating the differences between the model hydraulic pressure and the measured hydraulic pressure while applying a third ramp current until the measured hydraulic pressure reaches a designated fourth reference hydraulic pressure, from a state in which the current is applied to the solenoid valve to apply the first target pressure to the clutch, calculating an average error between the model hydraulic pressure and the measured hydraulic pressure in a region in which the measured hydraulic pressure is greater than a designated third reference hydraulic pressure, which is less than the fourth reference hydraulic pressure, and is the fourth reference hydraulic pressure or less, calculating an average error amount by multiplying the average error by an integral area with the difference integral value, and setting the deflection amount to a value acquired by subtracting the average error amount from the difference integral value.

In the determining the appropriateness, when the deflection amount is the second reference value or less, the temporary VKP pressure may be updated with a new temporary VKP pressure acquired by lowering the temporary VKP pressure by a designated correction pressure, the second target pressure may be set using the updated temporary VKP pressure, and the determination of the appropriateness may be repeatedly performed.

In the determining the appropriateness, when the deflection amount is the third reference value or more, the temporary VKP pressure may be updated with a new temporary VKP pressure acquired by raising the temporary VKP pressure by a designated correction pressure, the second target pressure may be set using the updated temporary VKP pressure, and the determination of the appropriateness may be repeatedly performed.

The determining the appropriateness may include calculating the difference integral value by integrating the differences between the model hydraulic pressure and the measured hydraulic pressure while applying a fourth ramp current until the measured hydraulic pressure reaches a designated sixth reference hydraulic pressure, from a state in which the current is applied to the solenoid valve to apply the second target pressure to the clutch, calculating an average error between the model hydraulic pressure and the measured hydraulic pressure in a region in which the measured hydraulic pressure is greater than a designated fifth reference hydraulic pressure, which is less than the sixth reference hydraulic pressure, and is the sixth reference hydraulic pressure or less, calculating an average error amount by multiplying the average error by an integral area with the difference integral value, and setting the deflection amount to a value acquired by subtracting the average error amount from the difference integral value.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF ILLUSTRATIVE EMBODIMENTS

Figure 1:
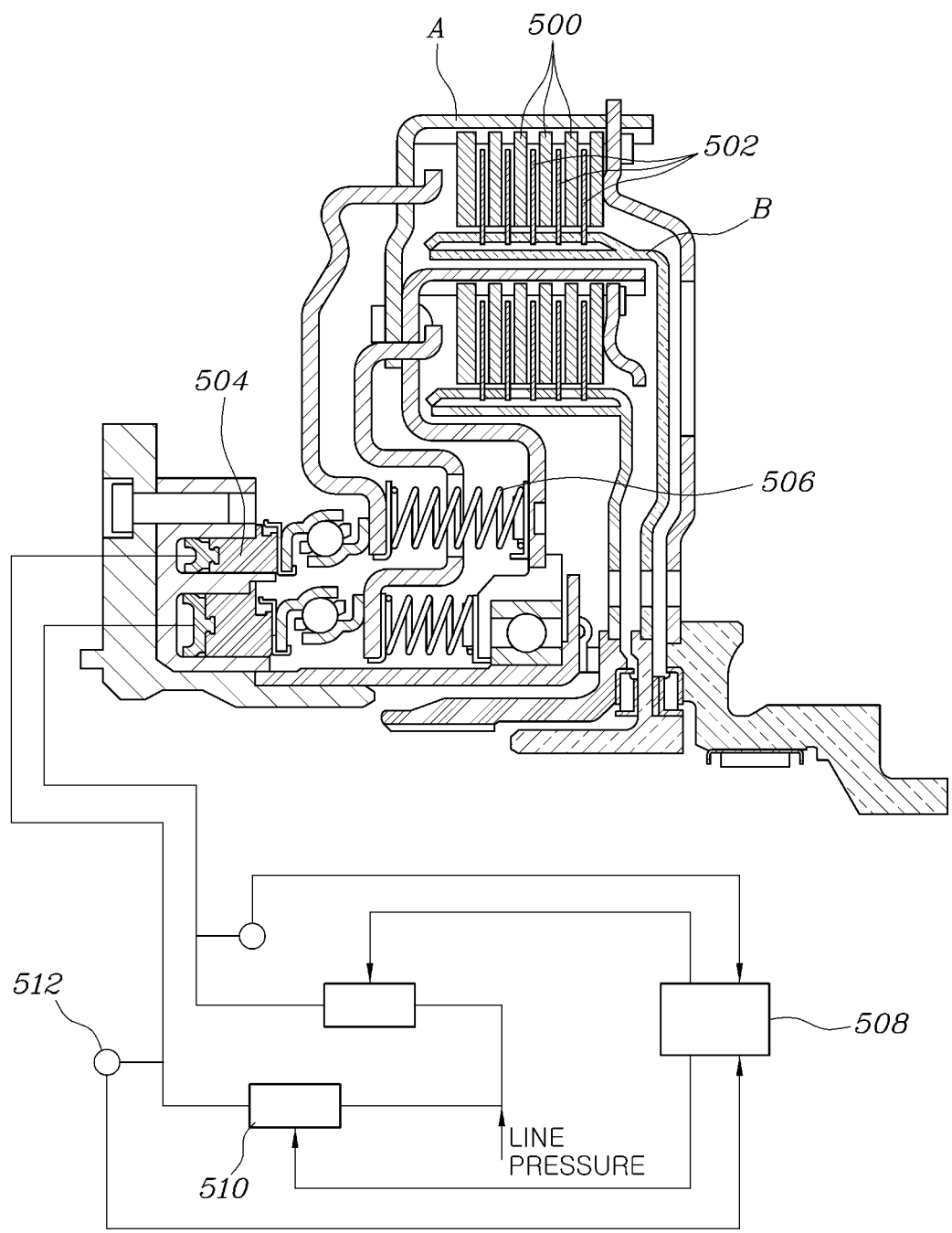
FIG. 1 is a view exemplarily illustrating a control circuit of a hydraulic multiple disc clutch to which the present invention is applicable.
Figure 2:
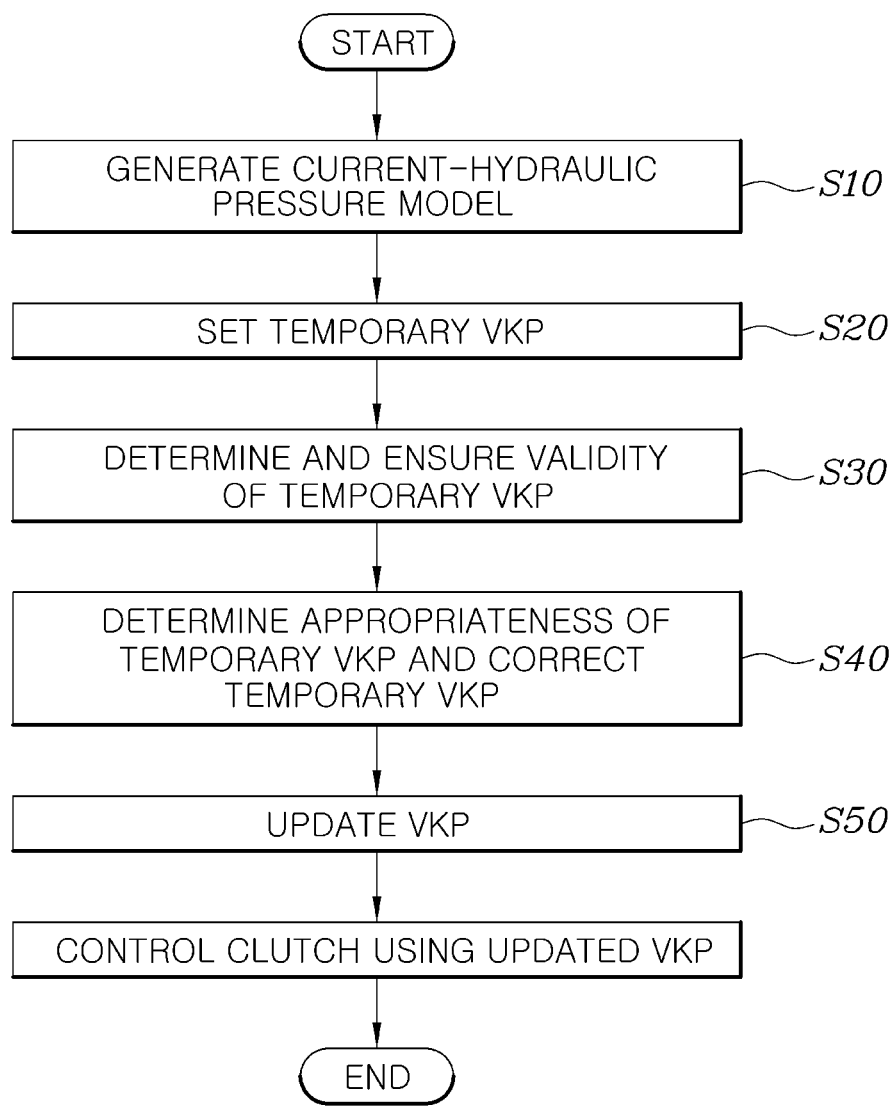
FIG. 2 is a flowchart showing a clutch control reference value setting method in accordance with one embodiment of the present invention.
Figure 3:
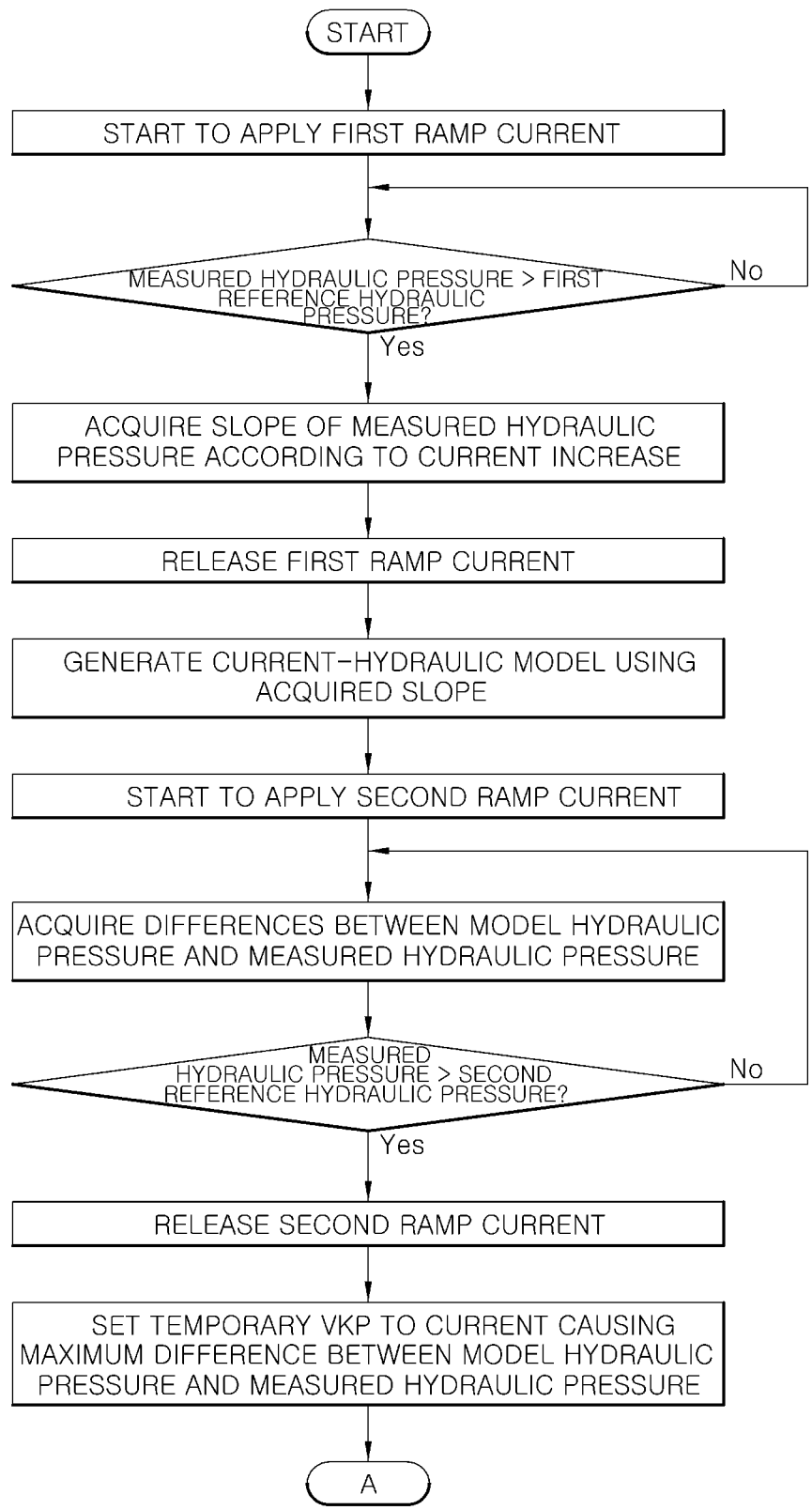
FIG. 3 is a flowchart exemplarily showing generation of a current-hydraulic pressure model and setting of a temporary VKP in FIG. 2.
Figure 4:
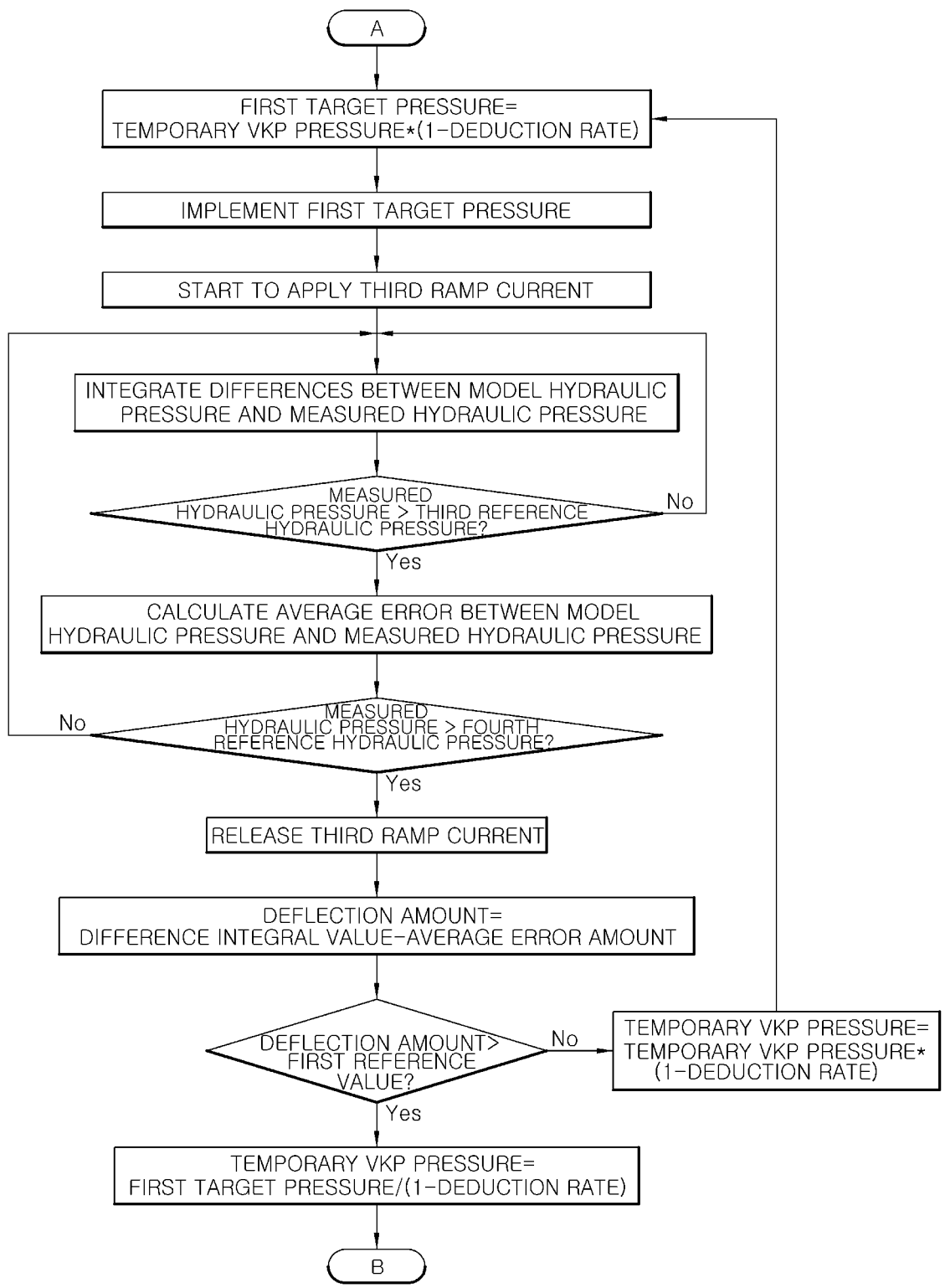
FIG. 4 is a flowchart exemplarily showing determination of validity in FIG. 2.
Figure 5:
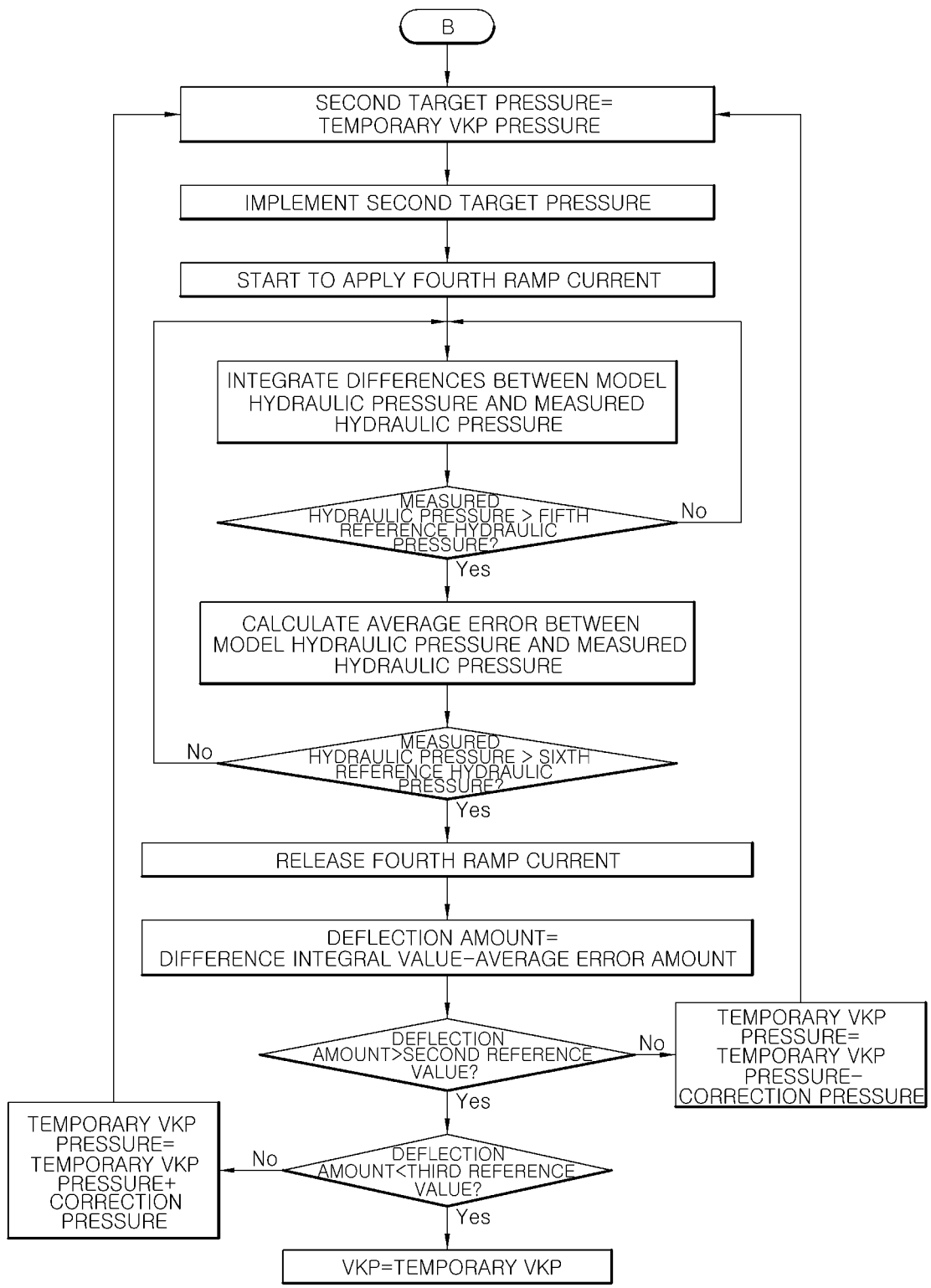
FIG. 5 is a flowchart exemplarily showing determination of appropriateness in FIG. 2.

Referring to FIGS. 2 to 9, a clutch control reference value setting method in accordance with one embodiment of the present invention includes generating a current-hydraulic pressure model using a slope of a hydraulic pressure applied to a clutch, which is measured while a controller applies a current to a solenoid valve (S10), setting a temporary VKP to a current causing a maximum difference between a model hydraulic pressure due to the current-hydraulic pressure model and a measured hydraulic pressure (S20), determining validity by setting a pressure lower than a temporary VKP pressure, which is a model hydraulic pressure at the temporary VKP, by a designated deduction rate, to a first target pressure and determining that the temporary VKP is valid when a deflection amount calculated from a difference integral value acquired by integrating differences between the model hydraulic pressure and the measured hydraulic pressure while increasing the current is greater than a designated first reference value under the condition that the first target pressure is applied to the clutch (S30), determining appropriateness by setting the temporary VKP pressure determined to be valid to a second target pressure and determining that the temporary VKP is appropriate when a deflection amount calculated from a difference integral value acquired by integrating differences between the model hydraulic pressure and the measured hydraulic pressure while increasing the current is greater than a designated second reference value and is less than a designated third reference value under the condition that the second pressure is applied to the clutch (S40), and updating a VKP with the temporary VKP determined to be appropriate (S50).

That is, in embodiments of the present invention, after the current causing the maximum difference between the model hydraulic pressure calculated by the current-hydraulic pressure model and the hydraulic pressure measured by a hydraulic pressure sensor is set to the temporary VKP, it is confirmed whether or not the temporary VKP is set to have validity by determining whether or not the deflection amount is in a valid level while increasing the current from the first target pressure which is lower than the temporary VKP pressure, it is confirmed whether or not the deflection amount is within a proper range which is greater than the second reference value and is less than the third reference value while increasing the current from the second target pressure which is set to be the same as the temporary VKP pressure, and, when the temporary VKP is determined to be appropriate, the VKP is newly set or updated with the temporary VKP.

Of course, the above process for setting the VKP may be performed while a transmission is manufactured in a factory or be performed in the state in which the transmission is mounted in a vehicle, and the controller in the vehicle controls the clutch based on the above-set VKP.

For reference, the term "temporary VKP pressure" substantially means the above-described "model hydraulic pressure at the temporary VKP". That is, the temporary VKP pressure means a model hydraulic pressure which is calculated when the current at the temporary VKP is input to the current-hydraulic pressure model. As such, a current or a pressure may mean a value for which a corresponding value is substituted by the current-hydraulic pressure model.

In generation of the current-hydraulic pressure model, the current-hydraulic pressure model is generated by acquiring the slope of the measured hydraulic pressure measured by the hydraulic pressure sensor according to a current increase by applying a first ramp current, which is gradually increased until the measured hydraulic pressure reaches a designated first reference hydraulic pressure, to the solenoid valve.

Figure 6:
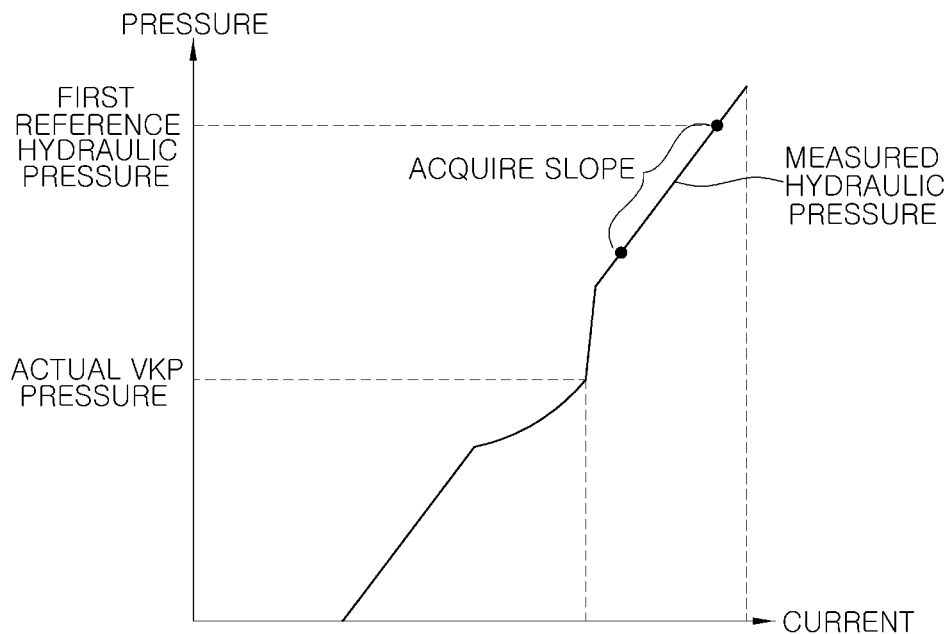
FIG. 6 is a graph illustrating generation of the current-hydraulic pressure model in FIG. 2.

Here, the first reference hydraulic pressure is set to the maximum pressure which is designed to be applied to the clutch or a pressure slightly lower than the maximum pressure, and the slope of the measured hydraulic pressure is calculated from hydraulic pressures measured in a section in which linearity is ensured, i.e., from a high hydraulic pressure sufficient to deviate from a non-linear section displayed as a depression at a middle portion of a curve shown in FIG. 6 to the first reference hydraulic pressure.

The current-hydraulic pressure model may be generated in the form of an equation describing a straight line using the calculated slope of the measured hydraulic pressure.

In setting of the temporary VKP, the temporary VKP is set to the current causing the maximum difference between the model hydraulic pressure and the measured hydraulic pressure by calculating the differences between the model hydraulic pressure and the measured hydraulic pressure by applying a second ramp current, which is gradually increased until the measured hydraulic pressure measured by the hydraulic pressure sensor reaches a designated second reference hydraulic pressure, to the solenoid valve.

Figure 7:
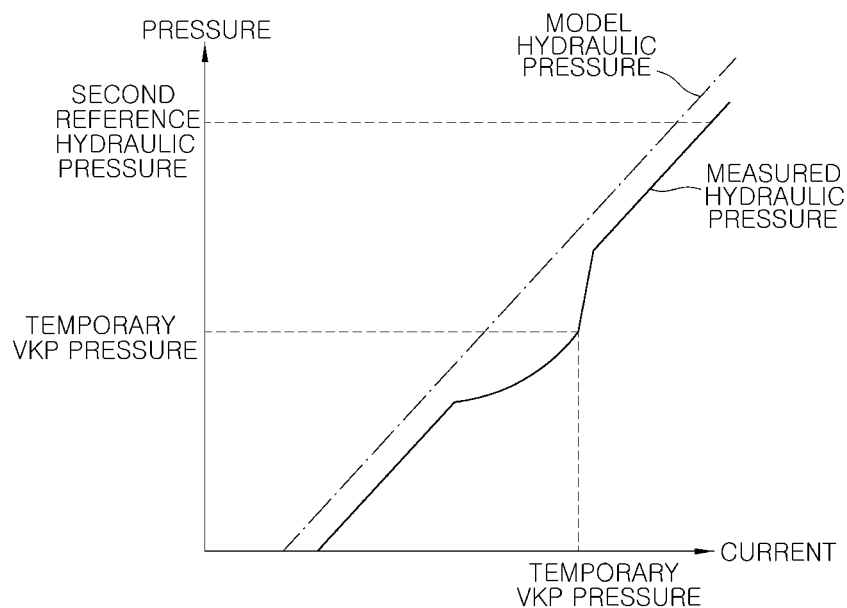
FIG. 7 is a graph illustrating setting of the temporary VKP in FIG. 2.

FIG. 7 illustrates the temporary VKP set by the above-described method.

Here, although the second reference hydraulic pressure may be set to be the same as or similar to the first reference hydraulic pressure, a hydraulic pressure causing the maximum difference between the model hydraulic pressure and the measured hydraulic pressure is considerably lower than the first reference hydraulic pressure in a general situation, and thus, the second reference hydraulic pressure is set to a hydraulic pressure which is sufficiently higher than the hydraulic pressure causing the maximum difference between the model hydraulic pressure and the measured hydraulic pressure and is lower than the first reference hydraulic pressure, and thereby, a time for performing setting of the temporary VKP may be shortened and the temporary VKP may be more rapidly set.

Figure 8:
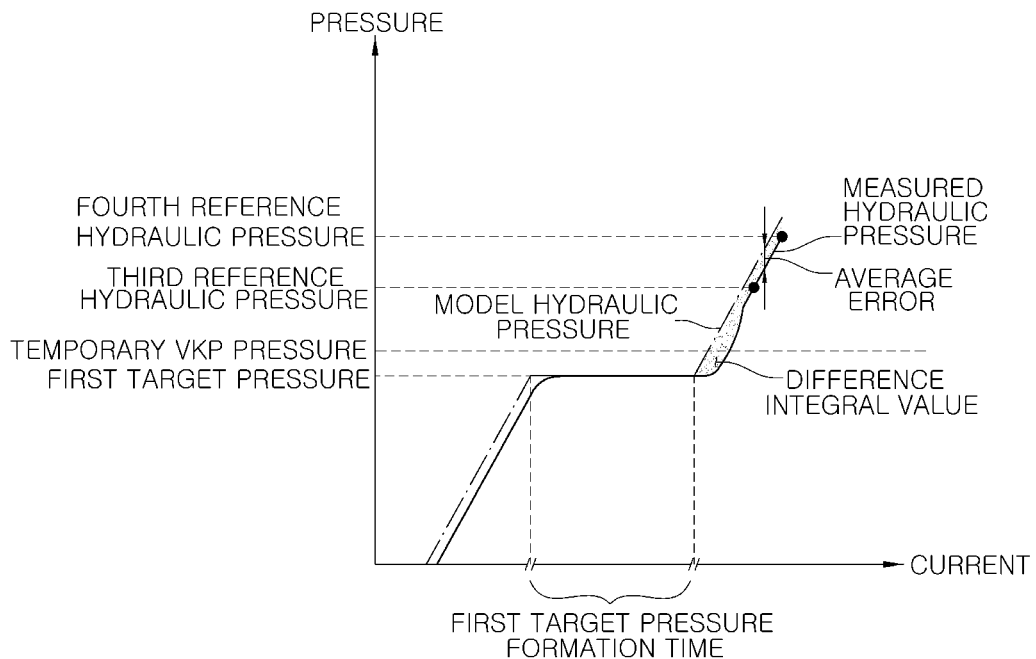
FIG. 8 is a graph illustrating determination of validity in FIG. 2.

In determination of validity, the first target pressure is set to be lower than the temporary VKP pressure by 90%, 85%, 80%, etc. by setting the deduction rate to 0.1, 0.15, 0.2, etc., and determination of validity is performed by gradually increasing the current applied to the solenoid valve under the condition that the first target pressure is applied to the clutch by applying a current to set the first target pressure to the solenoid valve for a sufficient time (for example, 1 second, 2 seconds, etc.), as exemplarily shown in FIG. 8. Here, the current which is gradually increased from the current applied to the solenoid valve so as to apply the first target pressure is referred to as a third ramp current.

For reference, the portion marked as a "first target pressure formation time" in FIG. 8 means a time sufficient to apply the current for setting the first target pressure, and the current is uniformly maintained for this time.

Here, since the model hydraulic pressure is uniformly and linearly increased depending on the slope as the current applied to the solenoid valve is increased, but the measured hydraulic pressure has the above-described non-linear section in which the measured hydraulic pressure locally sags downwards, the deflection amount is the sum of differences between the model hydraulic pressure which is linearly increased and the measured hydraulic pressure in the non-linear section.

Therefore, since the deflection amount calculated by applying the third ramp current has a value of a designated level when the temporary VKP is set to be similar an actual VKP and thus, the first target pressure is set to be sufficiently lower than an actual VKP pressure, the first reference value is set to a level at which it is ensured that the first target pressure is set to be sufficiently lower than the actual VKP and thus the temporary VKP is set so as to avoid being much higher than the actual VKP.

The reason for this is that, if the temporary VKP is set to be much higher than the actual VKP, the first target pressure may be set to a value which is close to the actual VKP or is higher than the actual VKP, and in this case, any deflection amount due to the third ramp current rarely occurs.

That is, determination of validity is performed to confirm that the set temporary VKP is not set to be much higher than the actual VKP.

In determination of validity, when the deflection amount is the first reference value or less, the temporary VKP pressure is decreased by the deduction rate and is then updated with an acquired new temporary VKP pressure, the first target pressure is set using the updated temporary VKP pressure, and determination of validity is repeatedly performed so as to ensure validity of the temporary VKP.

That is, since the deflection amount which is the first reference value or less means that the temporary VKP is set to be considerably higher than the actual VKP, as described above, the temporary VKP is set to be close to the actual VKP by decreasing the temporary VKP pressure by the deduction rate and then repeatedly performing determination of validity.

In determination of validity, the difference integral value may be calculated by integrating differences between the model hydraulic pressure and the measured hydraulic pressure while applying the third ramp current until the measured hydraulic pressure reaches a designated fourth reference hydraulic pressure from the state in which the current is applied to the solenoid valve to apply the first target pressure to the clutch, an average error between the model hydraulic pressure and the measured hydraulic pressure in a region in which the measured hydraulic pressure is greater than a designated third reference hydraulic pressure, which is less than the fourth reference hydraulic pressure, and is the fourth reference hydraulic pressure or less may be calculated, an average error amount may be calculated by multiplying the average error by an integral area of the difference integral value, and the deflection amount may be set to a value acquired by subtracting the average error amount from the difference integral value.

That is, the difference integral value is calculated by integrating differences between the model hydraulic pressure and the measured hydraulic pressure while the measured hydraulic pressure reaches the fourth reference hydraulic pressure from the first target pressure, the average error is calculated by averaging differences between the model hydraulic pressure and the measured hydraulic pressure while the measured hydraulic pressure reaches the fourth reference hydraulic pressure from the third reference hydraulic pressure, the average error amount is calculated by multiplying the average error by the integral area of the difference integral value, and the deflection amount may be calculated by subtracting the average error amount from the difference integral value.

Here, the third reference hydraulic pressure may be set to a hydraulic pressure at which the linear section is expected to start after the non-linear section when the third ramp current is applied, and the fourth reference hydraulic pressure may be set to the maximum pressure which is designed to be applied to the clutch or a pressure slightly lower than the maximum pressure, similarly to the first reference hydraulic pressure, and be ultimately set to a level that ensures accuracy in the average error.

That is, since as the fourth reference hydraulic pressure is raised, accuracy in the average error may be increased but a long time may be taken, the fourth reference hydraulic pressure may be set to be as low as possible while ensuring proper accuracy.

It is understood that the average error substantially occurs due to a delay in the response of the measured hydraulic pressure to the current applied to the solenoid valve by the controller, this average error tends to change slightly whenever a ramp current is applied to the solenoid valve, and thus, in embodiments of the present invention, the deflection amount may be more accurately calculated by calculating the average error whenever determination of validity is performed, calculating the average error amount by multiplying the average error by the integral area of the difference integral value and then calculating the deflection amount by subtracting the average error amount from the difference integral value.

In determination of appropriateness, in the state in which the controller applies a current for setting the second target pressure to the solenoid valve for a sufficient time (for example, 2 seconds, etc.) so as to apply the second target pressure to the clutch, determination of validity is performed by gradually increasing the current applied to the solenoid valve, and in this case, the current which is gradually raised from the current applied to the solenoid valve so as to apply the second target pressure is referred to as a fourth ramp current.

Figure 9:
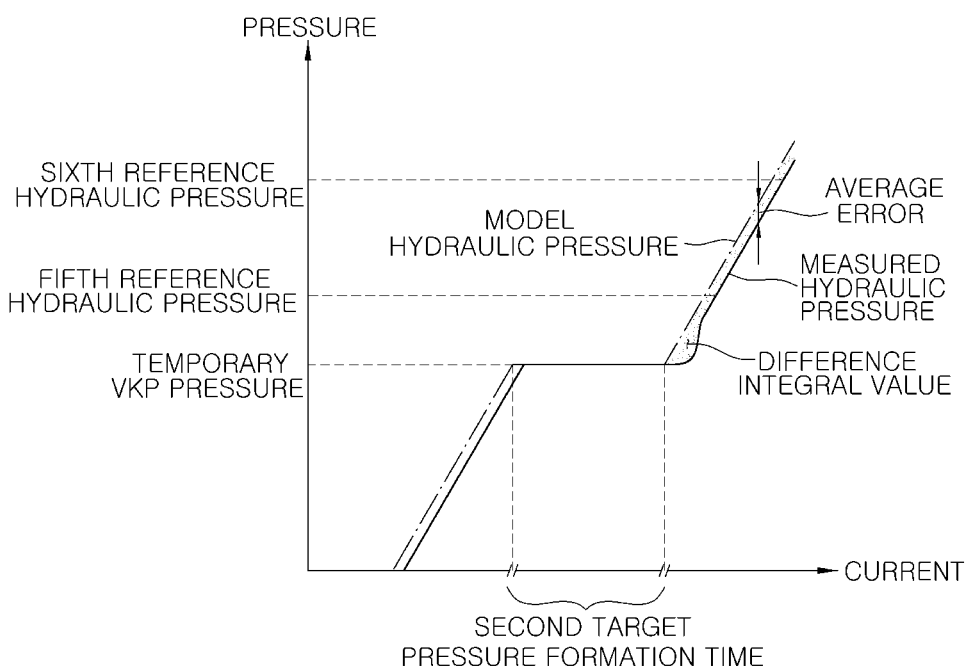
FIG. 9 is a graph illustrating determination of appropriateness in FIG. 2.

For reference, the portion marked as a "second target pressure formation time" in FIG. 9 means a time sufficient to apply the current for setting the second target pressure, and the current is uniformly maintained for this time.

The deflection amount calculated while applying the fourth ramp current should have a non-zero value that is not very big in consideration of the definition of the VKP, when the temporary VKP is set to be nearly the same as the actual VKP and thus the second target pressure is nearly the same as the actual VKP pressure, and thus, when the deflection amount is between the second reference value and the third reference value, as described above, the temporary VKP at this time is regarded as the actual VKP and thus the VKP is upgraded with the temporary VKP.

Therefore, when the deflection amount calculated by applying the fourth ramp current from the second target pressure is between the second reference value and the third reference value, as described above, the temporary VKP pressure corresponding to the second target pressure is set to a level that confirms that the temporary VKP pressure is nearly the same as the actual VKP pressure, and for example, the second reference value may be set to 0.1 Bar*sec and the third reference value may be set to 0.2 Bar*sec.

In determination of appropriateness, when the deflection amount is the second reference value or less, the temporary VKP pressure is lowered by a designated correction pressure and is then updated with an acquired new temporary VKP pressure, the second target pressure is set using the updated temporary VKP pressure, and determination of appropriateness is repeatedly performed.

Further, in determination of appropriateness, when the deflection amount is the third reference value or more, the temporary VKP pressure is raised by a designated correction pressure and is then updated with an acquired new temporary VKP pressure, the second target pressure is set using the updated temporary VKP pressure, and determination of appropriateness is repeatedly performed.

In determination of appropriateness, when the correction value is set to be 0.1 Bar, the second target pressure is raised or lowered by 0.1 Bar whenever determination of appropriateness is repeated, and thereby, the temporary VKP pressure is ultimately corrected to gradually converge on the actual VKP pressure, and thus, a temporary VKP at which the deflection amount is between the second reference value and the third reference value is found and the VKP is updated with the found temporary VKP.

Of course, in spite of repetition of determination of appropriateness, an abnormal situation in which the deflection amount is continuously not between the second reference value and the third reference value may arise, and when determination of appropriateness is repeated too many times, an excessively long time may be taken, and thus, determination of appropriateness may be repeated only a designated number of times, for example, seven times, and the VKP may be updated with a finally acquired temporary VKP.

In determination of appropriateness, the difference integral value may be calculated by integrating differences between the model hydraulic pressure and the measured hydraulic pressure while applying the fourth ramp current until the measured hydraulic pressure reaches a designated sixth reference hydraulic pressure from the state in which the current is applied to the solenoid valve to apply the second target pressure to the clutch, an average error between the model hydraulic pressure and the measured hydraulic pressure in a region in which the measured hydraulic pressure is greater than a designated fifth reference hydraulic pressure, which is less than the sixth reference hydraulic pressure, and is the sixth reference hydraulic pressure or less may be calculated, an average error amount may be calculated by multiplying the average error by an integral area of the difference integral value, and the deflection amount may be set to a value acquired by subtracting the average error amount from the difference integral value.

That is, in determination of appropriateness, the difference integral value is calculated by integrating differences between the model hydraulic pressure and the measured hydraulic pressure while the measured hydraulic pressure reaches the sixth reference hydraulic pressure from the second target pressure, the average error is calculated by averaging differences between the model hydraulic pressure and the measured hydraulic pressure while the measured hydraulic pressure reaches the sixth reference hydraulic pressure from the fifth reference hydraulic pressure, the average error amount is calculated by multiplying the average error by the integral area with the difference integral value, and the deflection amount may be calculated by subtracting the average error amount from the difference integral value.

Here, the fifth reference hydraulic pressure may be set to a hydraulic pressure at which the linear section is expected to start after the non-linear section when the fourth ramp current is applied, and the sixth reference hydraulic pressure may be set to the maximum pressure which is designed to be applied to the clutch or a pressure slightly lower than the maximum pressure, similarly to the fourth reference hydraulic pressure, and be ultimately set to a level that ensures accuracy in the average error.

That is, since as the sixth reference hydraulic pressure is raised, accuracy in the average error may be increased but a long time may be taken, the sixth reference hydraulic pressure may be set to be as low as possible while ensuring proper accuracy.

In the present invention, in the same manner as determination of validity, when determination of appropriateness is performed, the deflection amount may be more accurately calculated by calculating the average error whenever determination of appropriateness is performed, calculating the average error amount by multiplying the average error by the integral area of the difference integral value and then calculating the deflection amount by subtracting the average error amount from the difference integral value.

As is apparent from the above description, embodiments of the present invention provide a clutch control reference value setting method in which a VKP of a hydraulic multiple disc clutch controlled by a solenoid valve is more rapidly and accurately learned so as to improve rapidity and accuracy in control of the clutch.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method comprising:
    generating a current-hydraulic pressure model using a slope of a hydraulic pressure applied to a clutch, the hydraulic pressure being measured while a controller applies a current to a solenoid valve;
    setting a temporary volumetric kiss point (VKP) to a current causing a maximum difference between a model hydraulic pressure calculated from the current-hydraulic pressure model and a measured hydraulic pressure;
    determining validity of the temporary VKP by setting a pressure to a first target pressure that is lower than a temporary VKP pressure by a designated percent, the temporary VKP pressure being the model hydraulic pressure at the temporary VKP;
    determining that the temporary VKP is valid when a deflection amount calculated from a pressure difference integral value acquired by integrating differences between the model hydraulic pressure and the measured hydraulic pressure while increasing the current is greater than a designated first reference value when the first target pressure is applied to the clutch;
    determining that the temporary VKP is appropriate by setting the temporary VKP pressure determined to be valid to a second target pressure, wherein the temporary VKP is determined to be appropriate when a deflection amount calculated from a pressure difference integral value is greater than a designated second reference value and is less than a designated third reference value when the second target pressure is applied to the clutch, the pressure difference integral value being acquired by integrating differences between the model hydraulic pressure and the measured hydraulic pressure while increasing the current;
    using the temporary VKP as a control VKP after determining that the temporary VKP is appropriate; and
    controlling the clutch with the control VKP.

2. The method according to claim 1, wherein generating the current-hydraulic pressure model comprises generating the current-hydraulic pressure model by acquiring a slope of the measured hydraulic pressure according to a current increase by applying a first ramp current to the solenoid valve.

3. The method according to claim 2, wherein the first ramp current is gradually increased until the measured hydraulic pressure measured by a hydraulic pressure sensor reaches a designated first reference hydraulic pressure.

4. The method according to claim 1, wherein setting the temporary VKP to the second target pressure comprises setting the temporary VKP to the current causing the maximum difference between the model hydraulic pressure and the measured hydraulic pressure by calculating differences between the model hydraulic pressure and the measured hydraulic pressure.

5. The method according to claim 4, wherein setting the temporary VKP to the second target pressure comprises applying a second ramp current that is gradually increased until the measured hydraulic pressure measured by a hydraulic pressure sensor reaches a designated second reference hydraulic pressure.

6. The method according to claim 1, wherein determining the validity comprises updating the temporary VKP pressure with a new temporary VKP pressure when the deflection amount is the first reference value or less.

7. The method according to claim 6, wherein the new temporary VKP pressure is acquired by decreasing the temporary VKP pressure by the percent, setting the first target pressure using the updated temporary VKP pressure, and repeatedly performing the determination of the validity.

8. The method according to claim 1, wherein determining the validity comprises:
    calculating the pressure difference integral value by integrating the differences between the model hydraulic pressure and the measured hydraulic pressure while applying a third ramp current until the measured hydraulic pressure reaches a designated fourth reference hydraulic pressure;
    calculating an average error between the model hydraulic pressure and the measured hydraulic pressure in a region in which the measured hydraulic pressure is greater than a designated third reference hydraulic pressure and is less than or equal to the fourth reference hydraulic pressure, the designated third reference hydraulic pressure being less than the fourth reference hydraulic pressure;

calculating an average error amount by multiplying the average error by an integral area with the pressure difference integral value; and setting the deflection amount to a value acquired by subtracting the average error amount from the pressure difference integral value.

9. The method according to claim 8, wherein the pressure difference integral value is calculated from a state in which the current is applied to the solenoid valve to apply the first target pressure to the clutch.

10. The method according to claim 1, wherein determining that the temporary VKP is appropriate comprises, when the deflection amount is the second reference value or less, updating the temporary VKP pressure with a new temporary VKP pressure acquired by lowering the temporary VKP pressure by a designated correction pressure, setting the second target pressure using the updated temporary VKP pressure, and repeatedly performing a determination of whether the temporary VKP pressure is appropriate.

11. The method according to claim 10, wherein determining that the temporary VKP pressure is appropriate comprises, when the deflection amount is the third reference value or more, updating the temporary VKP pressure with a new temporary VKP pressure acquired by raising the temporary VKP pressure by a designated correction pressure, setting the second target pressure using the updated temporary VKP pressure, and repeating performing a determination of whether the temporary VKP pressure is appropriate.

12. The method according to claim 1, wherein determining that the temporary VKP pressure is appropriate comprises:

calculating the pressure difference integral value by integrating the differences between the model hydraulic pressure and the measured hydraulic pressure while applying a fourth ramp current until the measured hydraulic pressure reaches a designated sixth reference hydraulic pressure;

calculating an average error between the model hydraulic pressure and the measured hydraulic pressure in a region in which the measured hydraulic pressure is greater than a designated fifth reference hydraulic pressure and is less than or equal to the sixth reference hydraulic pressure, the designated fifth reference hydraulic pressure being less than the sixth reference hydraulic pressure;

calculating an average error amount by multiplying the average error by an integral area with the pressure difference integral value; and setting the deflection amount to a value acquired by subtracting the average error amount from the pressure difference integral value.

13. The method according to claim 12, wherein the pressure difference integral value is calculated from a state in which the current is applied to the solenoid valve to apply the first target pressure to the clutch.

14. A method comprising:

measuring a hydraulic pressure applied to a clutch;
applying a first ramp current to a solenoid valve;
generating a current-hydraulic pressure model by acquiring a slope of the measured hydraulic pressure according to a current increase due to applying the first ramp current to the solenoid valve;

setting a temporary volumetric kiss point (VKP) to a current causing a maximum difference between a model hydraulic pressure calculated from the current-hydraulic pressure model and the measured hydraulic pressure;

determining validity of the temporary VKP by setting a pressure to a first target pressure that is lower than a temporary VKP pressure by a designated percent, the temporary VKP pressure being the model hydraulic pressure at the temporary VKP;

determining that the temporary VKP is valid when a deflection amount calculated from a pressure difference integral value acquired by integrating differences between the model hydraulic pressure and the measured hydraulic pressure while increasing the current is greater than a designated first reference value when the first target pressure is applied to the clutch;

determining that the temporary VKP is appropriate by setting the temporary VKP pressure determined to be valid to a second target pressure, wherein the temporary VKP is determined to be appropriate when a deflection amount calculated from a pressure difference integral value is greater than a designated second reference value and is less than a designated third reference value when the second target pressure is applied to the clutch, the pressure difference integral value being acquired by integrating differences between the model hydraulic pressure and the measured hydraulic pressure while increasing the current;

using the temporary VKP as a control VKP after determining that the temporary VKP is appropriate; and controlling the clutch with the control VKP.

15. The method according to claim 14, wherein the first ramp current is gradually increased until the measured hydraulic pressure measured by a hydraulic pressure sensor reaches a designated first reference hydraulic pressure.

16. The method according to claim 14, wherein setting the temporary VKP to the second target pressure comprises setting the temporary VKP to the current causing the maximum difference between the model hydraulic pressure and the measured hydraulic pressure.

17. The method according to claim 14, wherein determining the validity comprises updating the temporary VKP pressure with a new temporary VKP pressure when the deflection amount is the first reference value or less.

18. The method according to claim 14, wherein determining that the temporary VKP is appropriate comprises, when the deflection amount is the second reference value or less, updating the temporary VKP pressure with a new temporary VKP pressure acquired by lowering the temporary VKP pressure by a designated correction pressure, setting the second target pressure using the updated temporary VKP pressure, and repeatedly performing a determination of whether the temporary VKP pressure is appropriate.

* * * * *